Jan. 16, 1962 W. A. WILLIAMSON 3,016,987
PIVOTED VEHICLE STEERING MECHANISM
Filed Dec. 24, 1956 8 Sheets-Sheet 1

FIG.1

INVENTOR.
WILLIAM A. WILLIAMSON
BY
ATTY.

Jan. 16, 1962 W. A. WILLIAMSON 3,016,987
PIVOTED VEHICLE STEERING MECHANISM
Filed Dec. 24, 1956 8 Sheets-Sheet 2

*INVENTOR.*
WILLIAM A. WILLIAMSON
BY
ATTY.

Jan. 16, 1962 W. A. WILLIAMSON 3,016,987
PIVOTED VEHICLE STEERING MECHANISM
Filed Dec. 24, 1956 8 Sheets-Sheet 6

INVENTOR.
WILLIAM A. WILLIAMSON
BY
J. Frederick Bechtel
ATTY.

Jan. 16, 1962 W. A. WILLIAMSON 3,016,987
PIVOTED VEHICLE STEERING MECHANISM
Filed Dec. 24, 1956 8 Sheets-Sheet 8

INVENTOR.
WILLIAM A. WILLIAMSON
BY J. Frederick Bechtel
ATTY.

United States Patent Office 3,016,987
Patented Jan. 16, 1962

3,016,987
PIVOTED VEHICLE STEERING MECHANISM
William A. Williamson, Battle Creek, Mich., assignor to Clark Equipment Company, a corporation of Michigan
Filed Dec. 24, 1956, Ser. No. 630,197
12 Claims. (Cl. 187—9)

This invention relates to vehicular construction and more particularly to a pivoted steering mechanism for certain classes of vehicles.

With the advent of demand in certain industries, such as the steel industry, for larger and larger load handling capacity in materials handling vehicles, it has been found that known steering mechanisms are inadequate to provide desired steering characteristics. The device of this invention was developed to provide a solution to this problem, and also to generally improve known steering mechanisms.

Although the steering mechanism to be described is generally applicable to various classes of vehicles, we have found that in heavy industrial vehicles such as large capacity counterweighted fork lift trucks, a particularly acute problem exists in that the maximum available angularity of the kingpin universal joint of driving-steering axles is substantially less than that required to meet steering angle requirements, thereby necessitating an undesirable long radius of turn. It has also been found that utilization of a pivoted driving axle structure alone is insufficient to afford the desired minimum radius of steer because of limited available angulation of the main universal joint, about the vertical axis of which I preferably pivot the axle, wheels, and associated frame, body structure and other parts, as will be described in detail hereinafter. It has been found, however, that a satisfactorily small turning radius may be obtained by combining in a unique manner a novel pivoted steering-driving axle construction with linkage means automatically operative upon pivoting movement of the drive axle to simultaneously turn the steer wheels upon the axes of rotation thereof, whereby the resulting steering angle is equal to the sum of the angle through which the drive axle travels in relation to the vehicle axis plus the angle through which the dirigible wheels travel about the axes of rotation thereof.

In addition, it has been found that in order to make the class of vehicles under consideration suitable for movement over rough terrain, it is desirable to provide for oscillation or swiveling out of a horizontal plane the entire steering end of the vehicle. To this end I have provided structure which, in combination with the steering mechanism, permits simultaneous swiveling movement of the entire steering end of a vehicle in both horizontal and vertical planes, thereby effecting stability in operation over rough terrain while permitting independent but coordinated dirigibility of both the stering-driving axle and the associated wheels.

I contemplate as fully within the scope of this invention the use of my novel steering mechanism independently of any power drive connection thereto.

It is therefore an important object of this invention to provide in a vehicle improved dirigible means simultaneously pivotable about three axes of rotation.

It is another important object of this invention to provide in a vehicle dirigible means simultaneously and coordinately pivotable about three axes of rotation.

Another important object of this invention is to provide an improved construction for the radius of steer in vehicles of certain types.

Another object of this invention is to generally improve the supporting structure of the basic frame in vehicles of certain types.

A further object of this invention is to provide such a combination of structure in a vehicle that vehicular dirigible means is simultaneously pivotable about a plurality of vehicle axes which lie in mutually intersecting planes and about another axis which is transverse to the plural vertical axes.

An additional object of this invention is to provide generally improved steering and stabilizing mechanism for certain classes of vehicles.

It is a feature of this invention to provide in a vehicle a rear portion which is dirigible about a longitudinally offset axis and which is simultaneously and coordinately dirigible about the vertical axes of steer-drive wheels.

Another feature of this invention is to provide in a vehicle having a dirigible driving-steering axle, horizontally disposed pivot means about which the rear portion of the vehicle, including the steering-driving axle, is pivotable.

Yet another feature of this invention is to provide an improved counterbalanced materials handling vehicle having an articulated body portion which includes load counterweight means, dirigible axle means and dirigible wheel means and wherein said body portion is pivotable about offset pivot means.

Other objects, features, and advantages of this invention will be readily apparent to those skilled in the art from the following detailed description taken in conjunction with the accompanying drawings in which.

Figure 1:
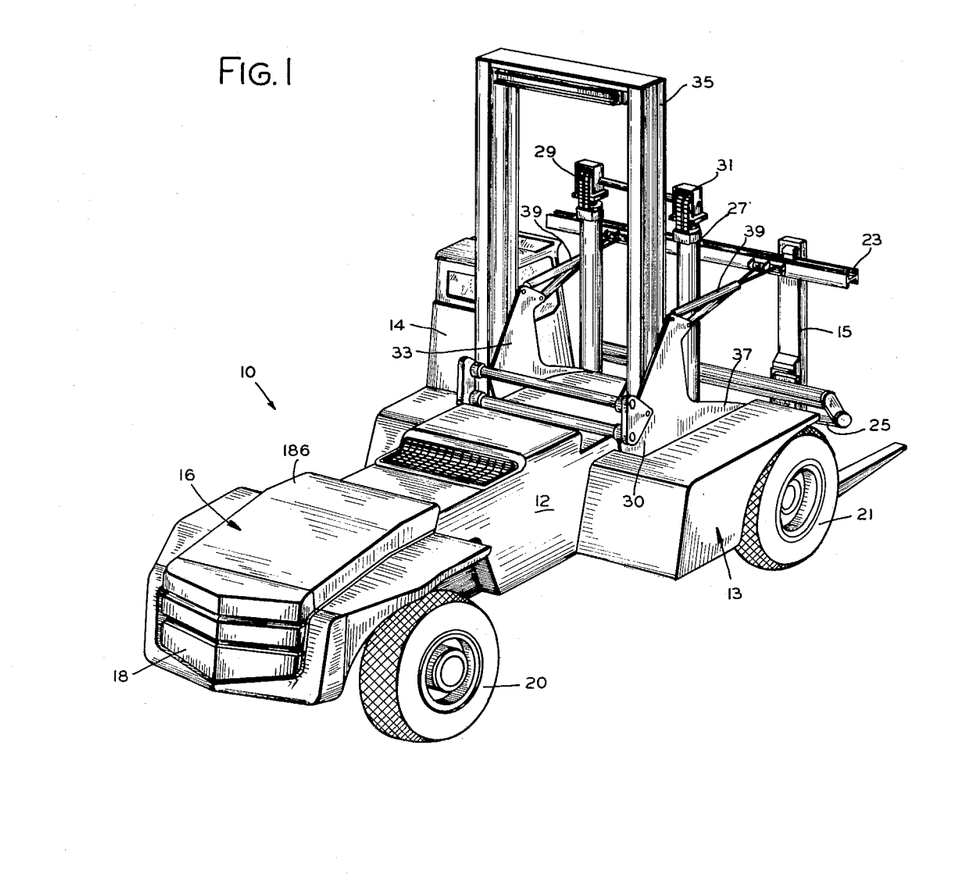
FIGURE 1 is a perspective view of a large capacity industrial lift truck which utilizes my invention.

Referring now to the drawings and first to FIGURE 1, a large capacity lift truck is shown for illustrative purposes at numeral 10 and comprises a center body portion 12 in which is housed prime mover means, such as an internal combustion engine, and a front body portion 13 which includes an operator's station or cab 14 in which a variety of control means are supplied for controlling tilting and elevating movements of load engaging fork means 15, for operating the engine in a body portion 12 and for controlling the transmission of power to and the steering angle of an after pivotable rear body portion 16 which includes a counterweight 18, dirigible wheels 20 and other structure to be hereinafter described in detail.

The front body portion 13 is suitably mounted upon frame members, not shown, which are supported by a pair of dual drive wheels 21, one of which is visible, which are driven by a forward drive axle, not shown. The fork means 15 is suitably supported upon an I-beam 23 and a transverse tube means 25. Hydraulic cylinder means, not shown, is provided for effecting lateral adjustment of the forks along the I-beam 23 and the tube 25. A pair of hydraulic motor means 27 having sheave means 29 connected to the rams thereof is adapted to actuate, by means of chains 31, a pair of axially extending bracket means 33 mounted for vertical movement in an upright mast structure 35. Forwardly extending legs 37 of said brackets 33 are connected to the tube means 25 for causing the forks and associated structure to be actuated vertically with the brackets 33 upon energization of the motor means 27. A plurality of hydraulic motor means 39 are connected between the upper portions of brackets 33 and the I-beam 23 for effecting tilting movement of the forks 15, when desired, about tube means 25. The mast structure 35 is secured to the front body portion 13 at a location rearward of the front axle, so as to minimize the required mass of counterweight 18.

A construction essentially similar to the mast 35, the hoisting means 27, and the brackets 33, tilting means 39, mounting structure for the forks 15 and associated structure, is fully disclosed and claimed in the copending application of Kenneth H. Mindrum, Serial No. 630,207, now Patent No. 2,904,203, filed December 24, 1956 (common assignee).

Design patent application Serial No. 44,306, now Design Patent No. D. 181,872, filed in the name of Kenneth H. Mindrum on December 24, 1956, covers a vehicular design generally similar to that shown in FIGURE 1 of the drawings.

Referring now to FIGURES 2 through 8, in which the fenders and body plate members of the rear portion 16 of the truck have been removed for illustrative purposes, the rear drive wheels 20 are mounted upon opposite ends of a differential drive axle of known construction which is housed within a differential drive axle housing 22. Each outer end of the axle housing 22 is flared outwardly at 24 in a manner to receive a joint means 26 which is pivotable laterally of the axle and which is connected to one of the wheels 20 in a manner to be hereinafter described in detail. The wheels 20 are dirigible about vertical axes of the joints 26.

Mounted inwardly adjacent of each wheel on the housing 22 is an I-shaped pad member 28 having a hollow web portion through which projects an arm of the axle housing. Longitudinally extending frame members 30 having converging end portions 32 are rigidly secured to the upper surface of the pads 28 and are maintained rigidly in the position shown by transversely extending frame members 34 and 36, and by a transversely and axially extending built-up box-like structure 38 (see FIGURES 2 and 4). An upwardly and forwardly extending frame member 42 having a notched end 44 at the one end thereof and a horizontally extending connecting pad member 46 at the opposite end thereof is secured at its lower end to transverse member 34 and at its upper end to a horizontally extending beam 48. The beam 48 has an enlarged end 50 which is formed to provide a cylindrical recess 52 in the under portion thereof for receiving an upper head portion 54 of a pivot tube means 56, a detailed description of which will appear hereinafter, and said enlarged end 50 is bolted to the pivot tube end 54 by means of bolts 58. The pad member 46 is connected to the one end of member 48 by means of bolts 60. Connected between the top edge of transverse member 36 and the bottom surface of pad 46 is a vertical channel beam 62. A pair of laterally spaced and triangular shaped plate members 64 converge in a forward direction between connections thereof to longitudinal frame members 30 and transverse beam 36, and a second pair of laterally spaced and triangular shaped plate members 66 extend axially of members 30 and are connected along the two legs of each side thereof to the members 30 and to opposite end portions of member 36.

The pivot tube 56 has connected thereto adjacent the upper end thereof an annular bearing member 68 and adjacent the lower end thereof an annular bearing member 70, both of which bearing members are fixedly connected to the outer wall of pivot tube 56. The lower end of the pivot tube passes through annular openings 72 and 74 in the longitudinally extending members of the boxlike structure 38, said annular openings 72 and 74 having bearing surfaces which are connected, as by welding, to adjacent portions of the bearing member 70. Upper bearing member 68 and the upper portion of bearing member 70 are mounted in and rotate with the races of upper and lower roller bearings 76 and 78, respectively, which are mounted in upper and lower flange portions 80 and 82, respectively, of spool or pivot housing member 84.

Axially extending cylindrical openings 86 and 88 are formed in opposite sides of flange 82, the longitudinal axes of which are preferably in the plane of the longitudinal axis of the truck. Cylindrical bearing insert members 90 and 92 are received in the openings 86 and 88 and are mounted for rotation upon stationary cylindrical tilt or pivot shafts 94 and 96. The pivot shaft 96 is received in an opening 106 of a downwardly extending leg 98 of a generally T-shaped bracket member 100 which is rigidly secured to one side of a transversely extending main frame member 102, member 102 being secured at its opposite ends to longitudinally extending main frame members 104 of the middle and forward portions 12 and 13 of the truck. A boss 108 is mounted on the rear portion of shaft 96 and is secured to the bracket member 100. A pair of laterally spaced, triangular shaped and upwardly extending supporting brackets 110 are secured, as by welding, to members 102 and 100, as shown best in FIGURE 2.

Figure 2:
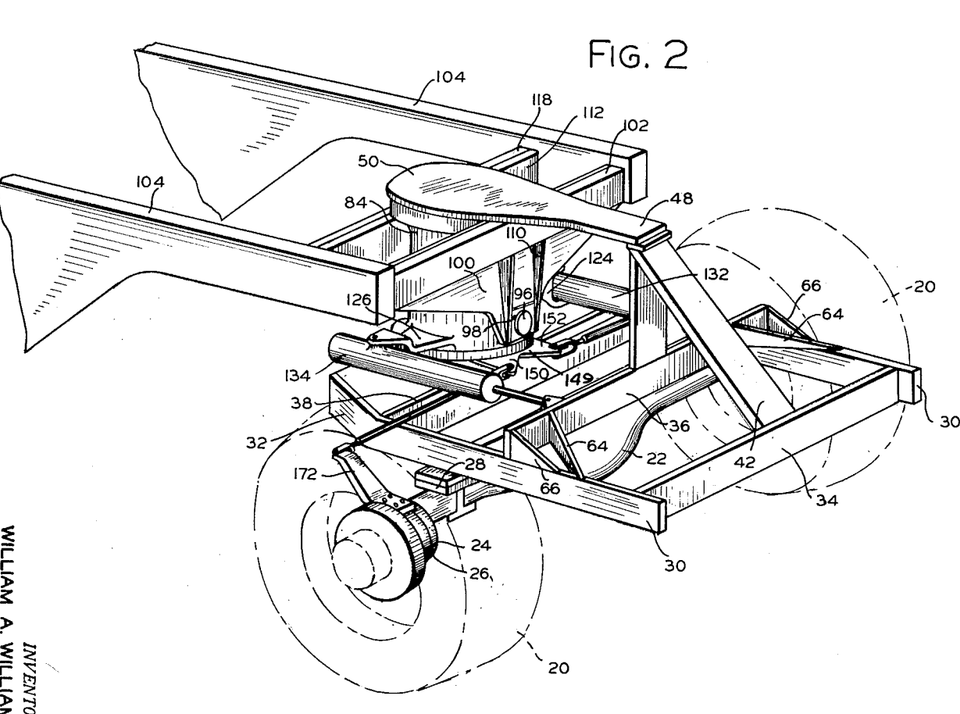
FIGURE 2 is a perspective view of that portion of the mechanism of this invention by means of which is accomplished simultaneous power steering of the vehicle by means of both the drive axle and the dirigible wheels.
Figure 3:
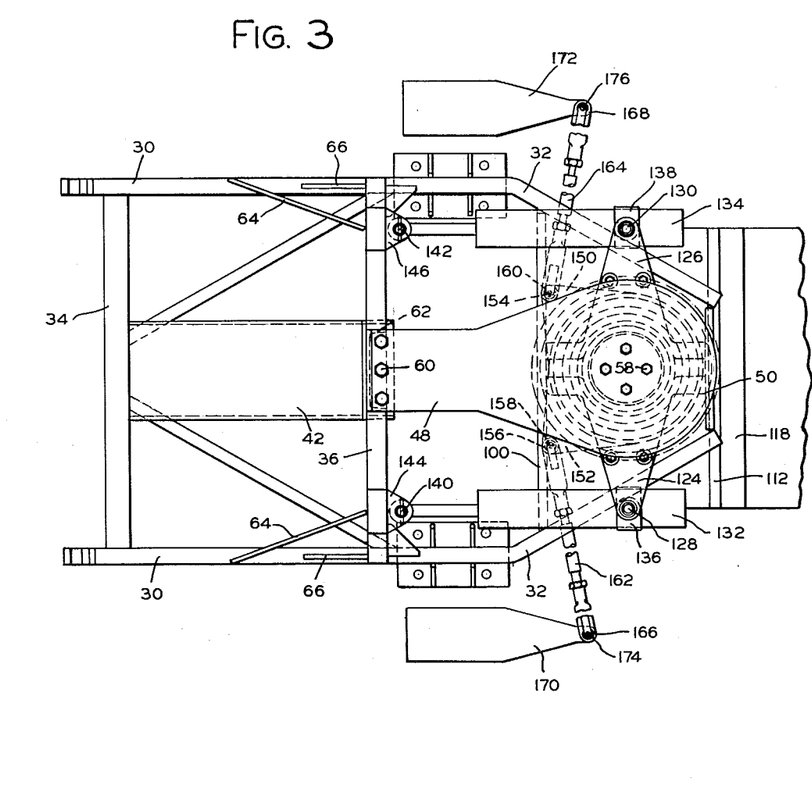
FIGURE 3 is a top plan view of the device, which includes the mechanism shown in perspective in FIGURE 2.
Figure 4:
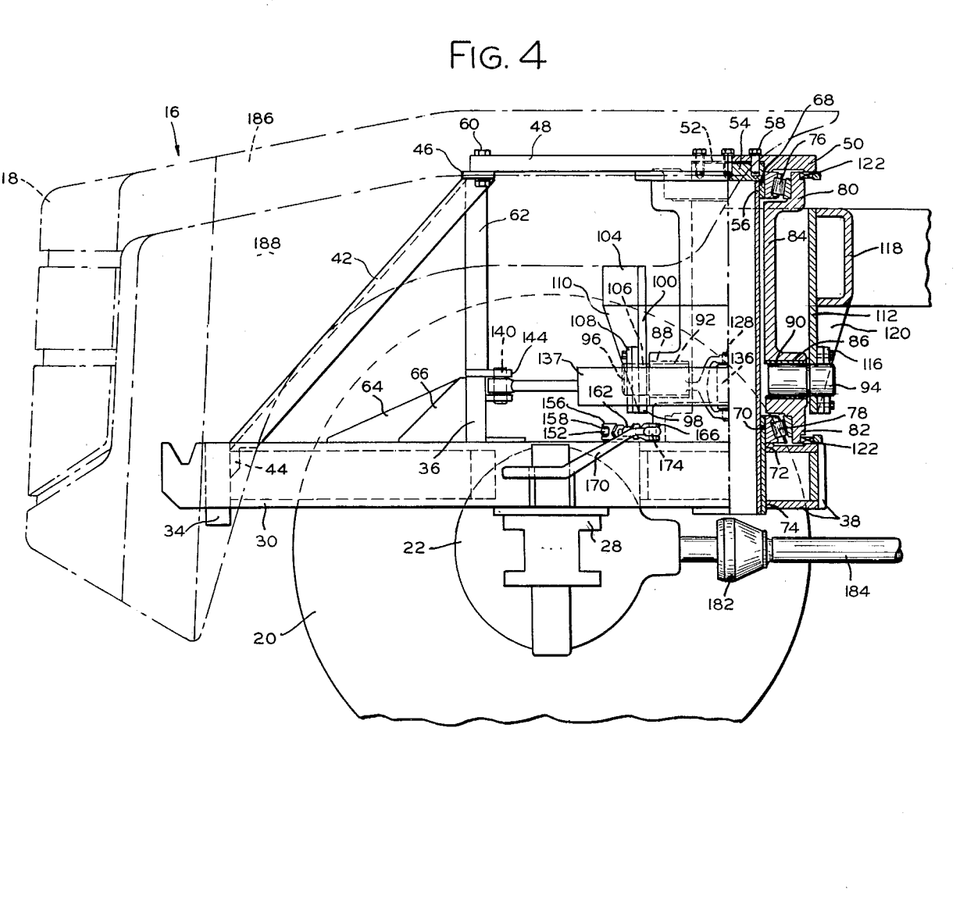
FIGURE 4 is a partially sectionalized side elevational view of the structure shown in FIGURE 3.
Figure 5:
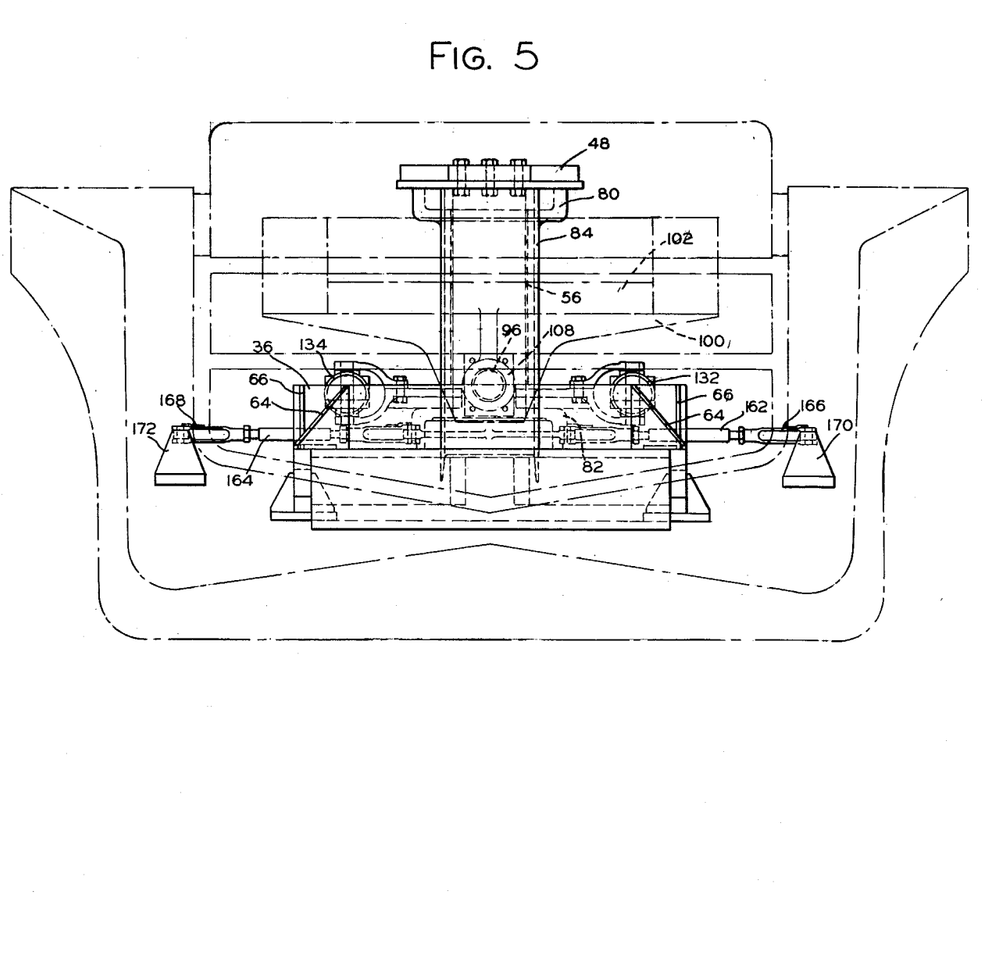
FIGURE 5 is a view taken from the left end of FIGURE 4.
Figure 6:
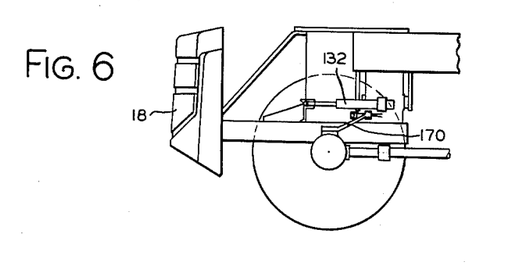
FIGURE 6 is a schematized side elevation of the structure shown in FIGURE 4.

The pivot shaft 94 is supported from the frame members 104 in a manner similar to the supporting means for pivot shaft 96, said shaft 94 being suspended by a generally T-shaped bracket member 112 which is secured to the ends of the legs of a channel member 118. Member 118 is secured to the inner sides of frame members 104. A boss 116 is mounted on the forward end of shaft 94 and is secured to member 112 in the same manner that boss 108 is secured to member 100. A pair of triangular shaped supporting brackets 120 are secured to members 112 and 118 in the same manner as brackets 110 are secured to members 100 and 102. Mounted between the upper longitudinally extending frame member 48 and the lower box-like frame section 38 are a pair of transversely extending annular oil and dirt seals, one of which is shown at numeral 122. The pivot shafts 94 and 96 are secured in rigid positions relative to the supporting structure therefor.

Extending transversely of the truck in opposite directions and secured to the flanged end 82 of spool member 84 are a pair of bifurcated bracket members 124 and 126 which support at the open ends thereof a pair of hydraulic motor means 132 and 134 by means of pivot pins 128 and 130 and associated bands 136 and 138, respectively. The motor means 132 and 134 each comprises an hydraulic cylinder and piston assembly pivotable in a plane transverse to the plane of the axes of pivot pins 128 and 130. The piston rod ends of cylinder assemblies 132 and 134 are connected by pin means 140 and 142 to brackets 144 and 146, respectively, which extend forwardly of the transverse frame member 36 and are suitably secured thereto. Pressure fluid control means, not shown, is connected to the motor means 132 and 134 and is adapted to be controlled by an operator from the cab 14 is known manner such that the said motor means are always energized in opposite directions relative to one another for a purpose to be explained.

Connected to a portion of spool flange 82 and extending rearwardly therefrom is a bifurcated bracket member 149 having forked portions 150 and 152 which terminate in ends having openings 154 and 156, respectively, said openings being adapted to receive pivot pin members 158 and 160. Mounted on the opposite ends of pin member 158 is the bifurcated end of an adjustable link 162, and similarly mounted on pin member 160 is the bifurcated end of an adjustable link 164. The links 162 and 164 extend transversely outwardly from such connections and terminate at the outer ends thereof in bifurcated portions 166 and 168, which are connected to downwardly and rearwardly extending steering arms 170 and 172 by means of pivot pin members 174 and 176, respectively. The horizontal portions of steering arms 170 and 172 are secured, as by bolting, to the upper portions of joints 26 of axle 22.

A constant velocity universal joint 182 of well known construction is connected between a propeller shaft 184 and the drive axle in housing 22 for the purpose of insuring that a zero relative rotational velocity exists continuously between shafts 184 and the pinion shaft of the differential in housing 22 irrespective of variations in the angle therebetween. The construction and relative arrangement of parts, as illustrated in the preferred embodiment of my invention, is such that the vertical axis of rotation of pivot tube 56 is coaxial with the vertical axis of the universal joint 182.

The counterweight 18 is connected with a hood portion 186 and is suitably connected to the frame of the pivotable rear portion 16 of the truck.

Figure 9:
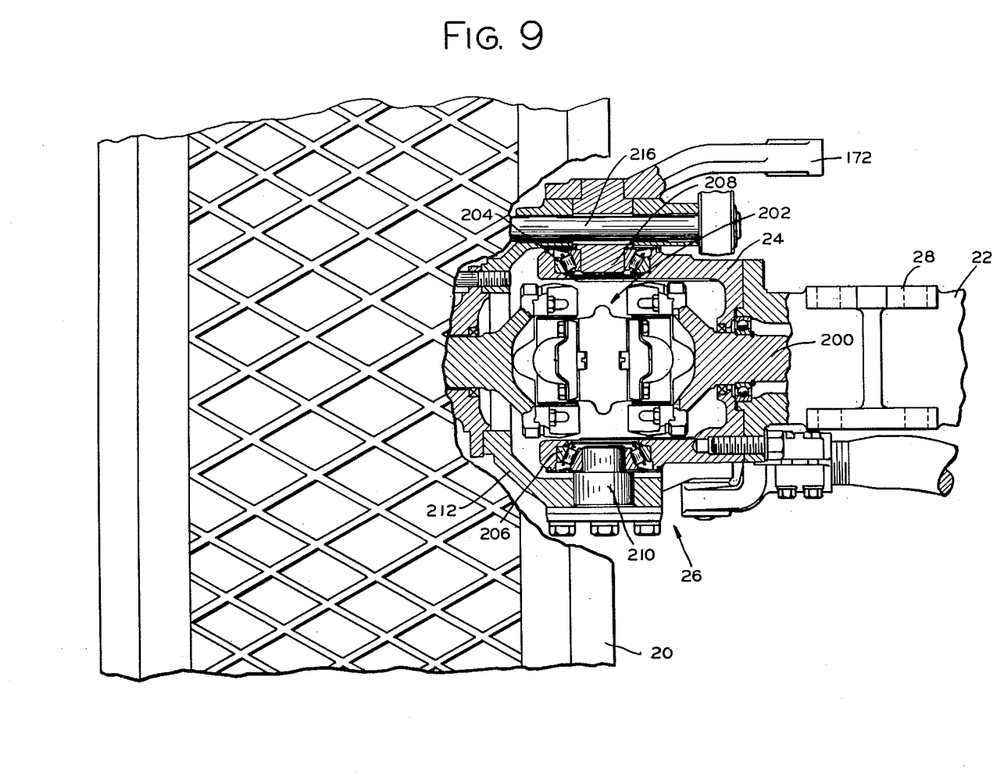
FIGURE 9 is a view in section of a means for mounting a dirigible drive wheel on a drive axle.

Referring now to FIGURE 9, there is illustrated a preferred embodiment of the joint means 26 (shown in the sectioned portion of FIGURE 9) wherein the one end of drive axle 200 is adapted to drive the wheel 20 through a double Cardan type universal joint 202, of well known construction, and a planetary gear set, not shown, is located adjacent the end of the drive axle in wheel 20 for drivably connecting the axle to the wheel.

To the flared-out portion 24 of axle housing 22 is mounted in vertically spaced relation roller bearings 204 and 206, and a pair of trunnion pins 208 and 210 to which the wheel 20 is rigidly connected by means of generally cylindrical and inwardly extending wheel hub portion 212. The double universal joint 202 is housed within the cavity of hub portion 212. To the upper trunnion pin 208 and to the hub portion 212 is connected one of the steering arms (170 or 172). A portion of an air brake system is shown at 216. As is well known, the double Cardan type universal joint is utilized to insure that a zero relative rotational velocity will continuously exist between sections of the drive shaft 200 connected to opposite ends of the universal joint irrespective of variations in the angle therebetween.

As will now be apparent, actuation of the steering arms 170 and 172 during pivoting movement of the axle 200 and housing 22 therefor will effect a pivoting movement of the wheels 20 on trunnion pins 208 and 210 about an axis of the universal joint 202.

Figure 7:
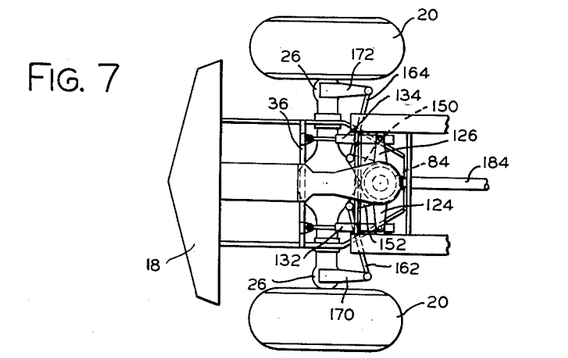
FIGURE 7 is a schematized plan view of the structure shown in FIGURE 3.
Figure 8:
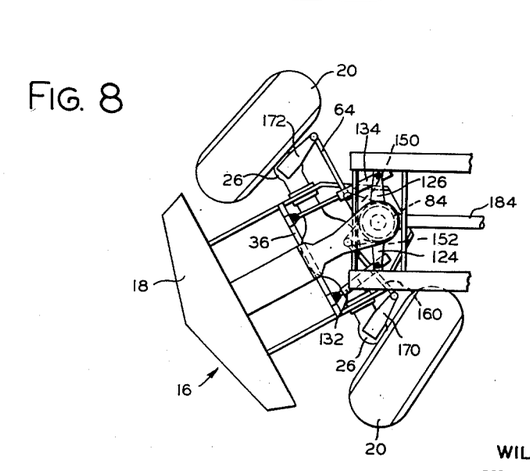
FIGURE 8 is another view of the structure shown in FIGURE 7 with the dirigible wheels and the steer-drive axle illustrated in a left-cramp position.

Referring now to the operation of the truck 10 (constructed in accordance with the embodiment illustrated in FIGURES 2–9) when it is traveling on a flat horizontal surface, it will be recognized that the rear portion 16 thereof assumes a centered position on the pivot shafts 94 and 96 such that said rear portion lies in the longitudinal plane of the center and front portions 12 and 13 of the truck. The operator of the truck may at any time selectively direct hydraulic fluid under pressure to steer cylinders 132 and 134 to effect a lateral swinging movement of the entire rear portion 16 about the vertical axis of pivot tube 56. As will be apparent to persons skilled in the art, such swinging movement of truck portion 16 induces differential angular pivoting movement of the wheels 20 about the vertical axes of the joints 26, as best shown in FIGURE 8, as a result of the lateral displacement of the joints 158 and 160 of members 150 and 152 from the longitudinal axis of the truck. If such joints were coaxially located on the center line of the truck it will be apparent that the wheels 20 would be pivoted through substantially equal angles during swinging movement of truck portion 16. It will also be apparent that the differential steering angle between wheels 20 may be varied as desired by varying the lateral distance between the pivot joints 158 and 160.

Approximately ideal differential steering angle between the wheels 20 may be provided for in my pivoted steering axle construction by predetermining a desired distance between the vertical axis of pivot tube 56 and the vertical axis of steering axle 22 in selective combination with a selected length of links 162 and 164 and a calculated lateral spacing between the pivot joints 158 and 160. This will provide the proper difference in angular rotation between the steer wheels 20 for any given angle of rotation of truck portion 16 about the axis of rotation thereof.

Figure 10:
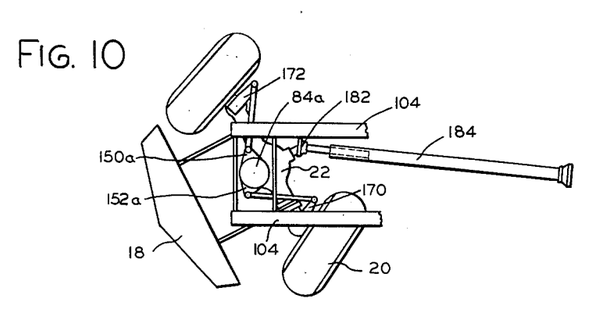
FIGURE 10 is a schematized plan view of a modification of my device as shown in FIGURES 6–8.
Figure 11:
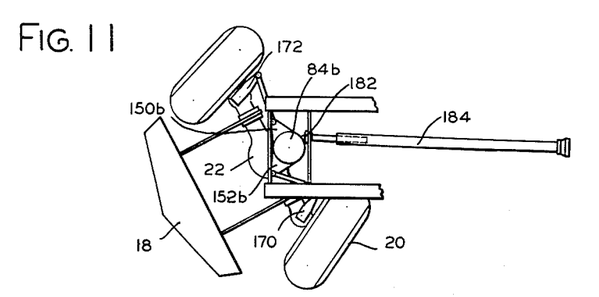
FIGURE 11 is a schematized plan view of another modification of my device.
Figure 12:
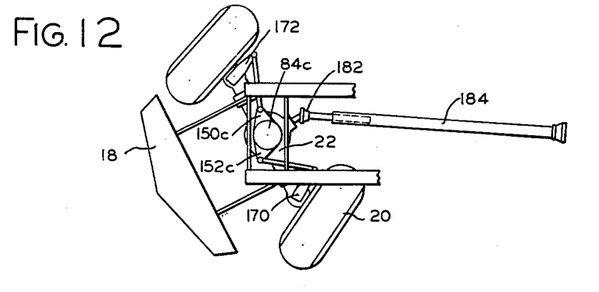
FIGURE 12 is a schematized plan view of yet another modification of my device.

Simultaneous energization of cylinders 132 and 134 in retraction and extension, respectively, effects a counterclockwise torque (as seen in FIGURE 7) which acts through frame members 36 and 30 to effect a selected amount of rotation of the entire frame, axle and body structure of truck portion 16 about the aligned vertical axes of pivot tube 56 and universal joint 182. During such rotation of the rear portion of the truck, pivot tube 56 is caused to be rotated in roller bearings 76 and 78, while pivot tube housing 84 and bracket member 149 remain stationary. It is important to note that in this preferred embodiment the drive axle unit 22 is not rotated about its own vertical axis, but about the vertical axis of pivot tube 56 which is spaced a substantial distance forwardly of the drive axle unit. Such construction effects a substantially maximum distance of swing of the truck portion 16 to either side of the longitudinal axis of the truck. I do not intend, however, to limit myself to such construction, as will become apparent hereinbelow in connection with the description of various other embodiments of my invention as shown in FIGURES 10, 11 and 12.

Rotation of the rear portion 16 as above described tends to swing the movable pivoted connections 168, 176 between steering arm 172 and link 164 towards the fixed pivoted connection 154, 160 between bracket 149 and link 164, and tends to swing the movable pivoted connection 166, 174 between steering arm 170 and link 162 away from the fixed pivoted connections 156, 158 between bracket member 149 and link 162. However, due to the fact that the lengths of links 162 and 164 are fixed, said links cause the wheels 20 and steering arms 170 and 172 to pivot about the ball joints 26, as shown in FIGURE 8.

With the above described construction, coordinated swinging movement of both the drive axle and wheels about an offset center of rotation plus differential steering action of the wheels about the centers of rotation thereof may be effected. It is therefore possible to attain steering angles substantially in excess of 60° in trucks utilizing my pivoted steering axle construction, even though the maximum angulation of the universal joint is limited to substantially less than 60°. A much smaller radius of turn of the truck is therefore available with my construction than would be possible in trucks of the class described which utilized either steering axle rotation or wheel rotation alone.

Now in addition to the above described mode of operation of the pivoted steering axle construction, I have also provided for the pivoting about pivot shafts 94 and 96 of the entire portion 16 of the truck, including pivot tube housing 84, in either direction out of the horizontal plane of the truck, either together with steering action or independently thereof. The ability of the truck portion 16 to be simultaneously pivoted in such a plurality of planes facilitates not only a minimum turning radius of the truck, but also insures full tractive effort thereof whether the terrain over which the truck is traveling is relatively flat and smooth or rough and uneven. If the truck were being utilized, for example, on a hillside wherein a sudden reversal of slope relative to the transverse plane of the truck were encountered, the resulting pivoting or tilting of the truck portion 16 about the pivot shafts 94 and 96 would enable said truck portion to tilt in a direction opposite to the tilt of the forward and center portions of the truck, thereby enabling all wheels of said truck to remain in full contact with the supporting surface so as to provide little or no decrease in traction; at the same time full steering action in either direction is permitted.

Now while I have above described what I consider to be the most efficient manner of utilizing my invention, i.e., a construction wherein the vertical axis of the universal joint 182 is aligned with the vertical axis of the pivot tube 56, there is illustrated in FIGURES 10, 11 and 12 various modifications of the above described construction wherein I have provided for the displacement of the pivot tube and housing 56 and 84 such that the vertical axis thereof is variously located to the rear of the vertical axis of the drive axle and housing (FIGURE 10), intermediate the universal joint 182 and the drive axle and housing (FIGURE 11), and coincident with the vertical axis of the drive axle and housing (FIGURE 12).

The basic construction of the modifications shown in FIGURES 10, 11 and 12 is substantially the same as that of the preferred embodiment of FIGURES 2–8, except for obvious changes in the relative arrangement of parts to facilitate the disclosed variations in the location of the pivot tube and housing 56 and 84. Parts similar to those illustrated in FIGURES 2–8 are similarly numbered.

It will be noted that the forked portions 150a and 152a in FIGURE 10, 150b and 152b in FIGURE 11, and 150c and 152c in FIGURE 12 vary one with respect to the other in lateral and longitudinal displacement from the axis of the pivot tube housings 84a, 84b, 84c, respectively. As described hereinbefore, the lateral spacing between the end pivot joints 158 and 160 largely determines the differential angle of steer between the wheels 20 during turning thereof. It will be apparent that a displacement of the pivot tube and housing from the position illustrated in FIGURES 2–8 to the location illustrated at 84a in FIGURE 10, 84b in FIGURE 11 and 84c in FIGURE 12, necessitates a variation in this design feature in order to obtain approximately ideal differential steering angles.

In some applications where maximum angulation of the steering-driving axle and wheels is of no great importance, it may be found desirable to utilize one of the modified constructions illustrated in FIGURES 10–12.

From the above it will now be apparent that I have provided a dirigible wheel and steering axle construction in combination with an oscillating frame construction which greatly reduces the turning radius in trucks of the type contemplated and which provides for continuous traction during rough terrain operation with or without turning of the truck.

It will also be understood that minimization of the turning radius of the truck is substantially facilitated by the construction which permits the counterweight 18 to pivot with the steering-driving axle and wheels. The pivoted counterweight construction further allows the overall truck length to be minimized, thereby improving the supporting structure of the basic truck frame. For example, it will be seen that the overhang of the counterweight 18 relative to the axle housing 22 would be necessarily increased if the counterweight did not pivot with the axle and wheels; i.e., a stationary counterweight construction would interfere with the turning of the wheels if it were located a distance rearwardly of the axle equal to the distance therefrom of the pivoted counterweight. Thus, a stationary counterweight would necessitate an increase in the overall length of any given truck utilizing the instant invention. Furthermore, the utilization of a pivoting counterweight permits same to stay within the tread of the wheels during turning thereof. Such would obviously not be the case with a stationary counterweight. Also, as pointed out above, as a result of the utilization of a pivoted counterweight, the supporting structure of the basic frame of the truck is much improved over that designable with a stationary counterweight construction.

Although only four embodiments of this invention have been particularly described, it will be understood that many changes might be made in the form, construction and relative arrangement of the parts without departing from the scope of the invention.

I claim:

1. Vehicular means comprising a first body portion and a second dirigible body portion, said second body portion having a longitudinally extending framework, an axle unit supporting said framework and movable with said second body portion, dirigible wheels mounted at opposite ends of said axle unit for rotation both with the axle unit and relative to the axle unit, a pivot housing mounted in axially spaced relation to said axle unit and connected to said first body portion, a pivot shaft mounted within said pivot housing for rotation relative thereto, force transmitting means connected to said dirigible body portion for actuating it with said pivot shaft about the axis of said pivot shaft, said pivot shaft being connected to said framework, force transmitting linkage connecting said dirigible wheels to said pivot housing for simultaneously rotating said dirigible wheels relative to said axle unit coordinate with rotation of said axle unit with said pivot shaft, and pivot means mounted transversely of said pivot housing and longitudinally of said first body portion supporting said pivot housing and dirigible body portion for rotation in a plane transverse to the plane of rotation of said dirigible body portion with said pivot shaft, whereby said dirigible body portion, including said axle unit and wheels, is independently pivotable in either of said planes or is simultaneously pivotable in both of said planes.

2. Vehicular means as claimed in claim 1 wherein said first body portion houses prime mover means, drive means connected between said prime mover means and said axle unit for transmitting tractive effort to said wheels, and universal joint means in said drive means for permitting rotation of said second body portion about the axis of said pivot shaft.

3. In a counterbalanced industrial lift truck having load engaging means mounted forwardly thereof and a first body portion associated with the load engaging means, an articulated body portion, upwardly extending pivot means connecting the articulated body portion to the first body portion, steering axle means supporting said articulated body portion, vehicle supporting wheels mounted adjacent opposite ends of said axle means for pivotal movement relative thereto, actuating means operatively connected between said first body portion and said steering axle unit for swinging the articulated portion of said truck, including said axle means, in either direction out of the longitudinal plane of said first body portion, load counterbalancing means secured to said articulated portion and swingable with said articulated portion about said pivot means, said counterbalancing means being mounted on said articulated portion to overhang one side of said axle means and located continuously intermediate said supporting wheels during steering movement of said wheels and said articulated body portion, said axle means being intermediate said counterbalance means and the load engaging means, and means connected to said wheels for continuously coordinating relative pivotal movement thereof with swinging of the articulated portion such that said wheels always pivot relative to said axle means in the same direction as said axle means pivots relative to said first body portion.

4. A vehicle comprising a first body portion, body pivot means associated with one end of the first body portion, an articulated body portion connected to the first body portion by said pivot means, a steering-driving axle unit supporting said articulated body portion and in longitudinally spaced relation from said pivot means, ground engaging dirigible traction wheels adjacent opposite ends of said axle unit, power means drivingly connected to said axle unit for driving said wheels, wheel pivot means connecting each of said dirigible wheels to said axle unit, actuating means connected to said articulated body portion for pivoting the articulated body portion and axle unit relative to and transversely of the first body portion and about said body pivot means, other actuating means connected to said wheel pivot means for pivoting said traction wheels relative to said axle unit, pivotal movement of said articulated body portion by said actuating means about said body pivot means always effecting through said other actuating means additional and concurrent pivotal movement in the same direction of said traction wheels on the wheel pivot means, whereby the transverse pivoted position of the steering-driving axle unit relative to the first body portion and the pivoted positions of the traction wheels relative to said axle unit combine to determine steering angle.

5. In a lift truck, a front load engaging body, a rear dirigible body comprising a drive axle, a pair of dirigible traction wheels, wheel pivot means mounting said wheels on opposite ends of said drive axle for pivotal movement relative thereto, frame means mounted on said axle and counterweight means mounted on said frame means intermediate said wheels and overhanging said axle means, power means drivingly connected to said drive axle and traction wheels, body pivot means connecting said dirigible body to the front body, first actuating means connected to said wheel pivot means, and second actuating means connected to said dirigible body for pivoting said dirigible body about said body pivot means for steering the lift truck, pivotal movement of said dirigible body effecting through said first actuating means additional and concurrent coordinated pivoting of each of said traction wheels about said wheel pivot means in the same direction as pivotal movement of said dirigible body, said counterweight pivoting with said dirigible portion intermediate said traction wheels.

6. In a counterbalanced lift truck having a front body, prime mover means in said front body and elevatable load engaging means mounted adjacent one end of said front body, a dirigible body located at the other end of the front body including drive axle means, dirigible wheels mounted pivotally on the opposite ends of said axle means for coordinated dirigible movement with and relatively to said axle means, said axle means and wheels being drivingly connected to the prime mover means, and load counterbalance means supported by and overhanging said axle means, pivot means pivotally connecting said dirigible body to said front body, first actuating means operatively connecting said wheels to said pivot means, and second actuating means connected to said dirigible body for pivoting said dirigible body with the counterbalance means out of the longitudinal plane of said front body, such pivoting of said dirigible body effecting through said first actuating means additional and differential pivoting movement of said drive wheels relative to the drive axle means and in the same direction as the axle means.

7. A lift truck as claimed in claim 6 wherein oscillation pivot means is located transversely of the first mentioned pivot means for connecting said dirigible body portion to said first body portion to permit additional pivotal movement of said dirigible body portion in a direction transverse to the pivotal movement thereof about said first mentioned pivot means.

8. A lift truck as claimed in claim 6 wherein said load counterbalance means is fixedly connected to said dirigible body portion and extends rearwardly from the axle means to counterbalance loads engaged by the load engaging means, said counterbalance means being adapted to be moved with said dirigible body portion in any available direction relative to said first body portion, whereby turning radius of the truck and over-all truck length both tend to be minimized, said counterbalance means being continuously located between said dirigible drive wheels during pivotal movement of the dirigible body portion in any direction.

9. A steering system for a vehicle having a front body means, comprising a rear dirigible body means, axle means supporting the dirigible body means, ground engaging dirigible wheels mounted at opposite ends of said axle means, wheel pivot means connecting said wheels to opposite ends of said axle means, first body pivot means connecting said dirigible body means to said front body means forwardly of said axle means, actuating means connected to said dirigible body means for pivoting the dirigible body means, axle means and wheels about said pivot means and transversely of said front body means, mechanism connected to said wheel pivot means operable concurrently and in coordination with said actuating means to provide steering movement of the wheels relative to the axle means during pivoting of the dirigible body means, energization of said actuating means to pivot said dirigible body means in transverse steering movement about said body pivot means concurrently effecting through said mechanism additional pivoting of said wheels on the wheel pivot means, and second body pivot means operatively connected to said front and dirigible body means in transverse relation to said first body pivot means such that said dirigible body means, axle means and wheels are oscillatable about said second body pivot means in a plane transverse to the plane of dirigible movement thereof.

10. A steering system as claimed in claim 9 wherein motive power means is connected from said front body means to said axle and wheel means, said axle and wheel means comprising tractive drive means for the vehicle.

11. In a power driven vehicle, a forward body section, and a rear steering-and-driving body section, said body sections including bearing means therebetween journaling said body sections together on a vertical axis of rotation, said rear body section including a transverse, driven axle longitudinally spaced from said vertical axis of rotation, wheel mounting means drivingly connected to opposite ends of said driven axle and each wheel mounting means including a vertical pivot axis longitudinally and laterally spaced from said vertical axis of rotation, force transmitting means connected to said rear body section for rotating said rear body section with respect to said forward body section and about said vertical axis of rotation, a force transmitting linkage connected to said vertical pivot axes of said wheel mounting means for simultaneously rotating said wheel mounting means about said vertical pivot axes in the same direction as the relative movement of said rear body section to effectively supplement and increase the turning angle between said body sections, second bearing means between said body sections providing a horizontal axis of relative rotation between said body sections, said second bearing means pivotally mounting said first bearing means on said horizontal axis of rotation, and power means drivingly connected to said driven axle and including universal connecting means aligned with said vertical axis of rotation.

12. In a power driven vehicle, a forward body section, and a rear steering-and-driving body section, said body sections including bearing means therebetween journaling said body sections together on a vertical axis of rotation, said rear body section including a transverse, driven axle pivotable about said vertical axis of rotation, wheel mounting means drivingly connected to opposite ends of said driven axle and each wheel mounting means including a vertical pivot axis laterally spaced from said vertical axis of rotation, force transmitting means connected to said rear body section for rotating said rear body section with respect to said forward body section and about said vertical axis of rotation, a force transmitting linkage connected to said vertical pivot axes of said wheel mounting means for simultaneously rotating said wheel mounting means about said vertical pivot axes in the same direction as the relative movement of said rear body section to effectively supplement and increase the turning angle between said body sections, second bearing means between said body sections providing a horizontal axis of relative rotation between said body sections, said second bearing means pivotally mounting said first bearing means on said horizontal axis of rotation, and power means drivingly connected to said driven axle.

References Cited in the file of this patent

UNITED STATES PATENTS

| | | |
|---|---|---|
| 1,747,166 | Fornaca | Feb. 18, 1930 |
| 2,078,034 | Smith | Apr. 20, 1937 |
| 2,182,102 | Tinker | Dec. 5, 1939 |
| 2,361,333 | Towson | Oct. 24, 1944 |
| 2,424,617 | Hoyle | July 29, 1947 |
| 2,426,652 | Storey | Sept. 2, 1947 |
| 2,494,324 | Wright | Jan. 10, 1950 |
| 2,503,181 | Wagner | Apr. 4, 1950 |
| 2,683,496 | Prost | July 13, 1954 |
| 2,788,858 | Aasland et al. | Apr. 16, 1957 |
| 2,835,397 | Wagner | May 20, 1958 |

FOREIGN PATENTS

| | | |
|---|---|---|
| 495,173 | France | June 19, 1919 |
| 908,573 | Germany | Apr. 8, 1954 |

UNITED STATES PATENT OFFICE
CERTIFICATE OF CORRECTION

Patent No. 3,016,987                      January 16, 1962

William A. Williamson

It is hereby certified that error appears in the above numbered patent requiring correction and that the said Letters Patent should read as corrected below.

Column 1, line 55, for "stering-" read -- steering- --; line 67, after "for" insert -- minimizing --; column 2, line 4, for "vehicle" read -- vertical --.

Signed and sealed this 31st day of July 1962.

(SEAL)
Attest:

ERNEST W. SWIDER
Attesting Officer

DAVID L. LADD
Commissioner of Patents